United States Patent
Ra et al.

(10) Patent No.: US 10,425,906 B2
(45) Date of Patent: Sep. 24, 2019

(54) APPARATUS AND METHOD FOR DETECTING UPSTREAM RF SIGNALS BASED ON PREAMBLE, AND APPARATUS FOR CABLE BROADCASTING USING THE SAME

(71) Applicant: ELECTRONICS AND TELECOMMUNICATIONS RESEARCH INSTITUTE, Daejeon (KR)

(72) Inventors: Sang-Jung Ra, Daejeon (KR); Jin-Hyuk Song, Daejeon (KR); Ho-Sook Lee, Daejeon (KR); Dong-Joon Choi, Daejeon (KR); Joon-Young Jung, Daejeon (KR); Nam-Ho Hur, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 8 days.

(21) Appl. No.: 15/819,969

(22) Filed: Nov. 21, 2017

(65) Prior Publication Data
US 2018/0167902 A1    Jun. 14, 2018

(30) Foreign Application Priority Data
Dec. 8, 2016   (KR) .......................... 10-2016-0166872

(51) Int. Cl.
H04W 56/00   (2009.01)
H04N 7/10    (2006.01)
(Continued)

(52) U.S. Cl.
CPC ........ *H04W 56/0005* (2013.01); *H04N 5/455* (2013.01); *H04N 7/10* (2013.01);
(Continued)

(58) Field of Classification Search
CPC .................................................. H04W 56/0005
See application file for complete search history.

(56) References Cited

U.S. PATENT DOCUMENTS 7,577,975 B2    8/2009   Han et al.
8,396,369 B1 *  3/2013   Farmer ............ H04B 10/25754
                                                         398/115
(Continued)

FOREIGN PATENT DOCUMENTS

KR   10-2016-0068323 A   6/2016
KR   10-2016-0109112 A   9/2016

*Primary Examiner* — Kevin M Cunningham

(57) ABSTRACT

Disclosed herein are an apparatus and method for detecting an upstream RF signal based on a preamble. The apparatus for detecting an upstream RF signal based on a preamble includes an analog-to-digital converter unit for receiving an RF analog signal and converting the same into an RF digital signal; a down-converter unit for converting the RF digital signal into a baseband digital signal; a packet detection unit for performing packet detection by performing an operation on the baseband digital signal and preset differential preamble signals; and a timing calculation unit for generating timing information of a terminal device based on the baseband digital signal and time information generated through the packet detection.

15 Claims, 8 Drawing Sheets

(51) Int. Cl.
*H04N 7/22* (2006.01)
*H04N 5/455* (2006.01)
*H04N 21/61* (2011.01)
*H04N 7/173* (2011.01)
*H04N 21/239* (2011.01)

(52) U.S. Cl.
CPC ......... *H04N 7/106* (2013.01); *H04N 7/17309* (2013.01); *H04N 7/22* (2013.01); *H04N 21/239* (2013.01); *H04N 21/6168* (2013.01); *H04W 56/00* (2013.01)

(56) References Cited

U.S. PATENT DOCUMENTS

| | | | |
|---|---|---|---|
| 8,630,374 B2 * | 1/2014 | Roh | H04L 27/2071 370/392 |
| 2004/0223556 A1 * | 11/2004 | Choi | H04L 27/0004 375/295 |
| 2007/0223928 A1 * | 9/2007 | Farmer | H04Q 11/0067 398/116 |
| 2010/0161966 A1 | 6/2010 | Kwon et al. | |
| 2012/0140858 A1 * | 6/2012 | Roh | H04L 27/205 375/343 |
| 2016/0164664 A1 | 6/2016 | Jung et al. | |

* cited by examiner

APPARATUS AND METHOD FOR DETECTING UPSTREAM RF SIGNALS BASED ON PREAMBLE, AND APPARATUS FOR CABLE BROADCASTING USING THE SAME

CROSS REFERENCE TO RELATED APPLICATION

This application claims the benefit of Korean Patent Application No. 10-2016-0166872, filed Dec. 8, 2016, which is hereby incorporated by reference in its entirety into this application.

BACKGROUND OF THE INVENTION

1. Technical Field

The present invention relates generally to technology for detecting RF signals, and more particularly to a digital signal conversion technique for detecting an upstream RF signal in a digital cable system.

2. Description of the Related Art

In order to meet the demand for future broadcast and communication services, which are developing into convergent, intelligent, and personalized services, digital cable technology is evolving into integrated broadcast-broadband services based on optical IP networks. Accordingly, the development of digital cable technology is focused on the development of techniques for providing interactive smart media services in an optical cable broadcast network without changing a transmission method used in an existing digital cable broadcast system and without replacing devices used therein, such as headend equipment, set-top boxes (STBs), and the like.

When RF over Glass (RFoG) is used in the current optical cable network, existing RF-based equipment may be used without change. However, an optical transmission module, which is necessary in order to convert an RF signal into an Amplitude Modulated (AM) optical signal, is too expensive to commercialize.

RFoG is a type of passive optical network based on Fiber To The Home (FTTH), in which optical fiber is extended to subscribers in an existing Hybrid Fiber and Coaxial (HFC) network and in which RF signals are transmitted over the optical fiber.

Here, channels for RF signals are assigned to frequency ranges using an existing method, and Data Over Cable Service Interface Specifications (DOCSIS) are used for two-way data communication. Here, an upstream RF signal based on DOCSIS, transmitted from a terminal, is converted into a digital signal, and the digital signal in the form of an IP packet is delivered to a Cable Modem Termination System (CMTS).

Meanwhile, Korean Patent Application Publication No. 10-2016-0068323, titled "Apparatus and method for transmitting upstream RF signal based on IP in cable broadcast network", relates to a technical idea for converting an analog upstream RF signal into a digital signal and transmitting the digital signal in the form of an IP packet based on an optical network in a cable broadcast network, and discloses an apparatus and method for transmitting an RF signal using a Passive Optical Network (PON) based on IP, rather than optical modulation of the upstream RF signal.

However, Korean Patent Application Publication No. 10-2016-0068323 has a limitation in that there may be an error in estimation of the time at which an RF signal is detected.

SUMMARY OF THE INVENTION

An object of the present invention is to provide an interactive smart media service by detecting an upstream RF signal without changing a transmission method used in a digital cable broadcast system and without replacing devices used therein.

Another object of the present invention is to reduce the computational load on hardware and complexity by detecting a packet regardless of the amplitude of a signal.

A further object of the present invention is to minimize error in estimation of an RF signal detected based on a preamble.

In order to accomplish the above objects, an apparatus for detecting an upstream RF signal based on a preamble according to an embodiment of the present invention includes an analog-to-digital converter unit for receiving an RF analog signal and converting the RF analog signal into an RF digital signal; a down-converter unit for converting the RF digital signal into a baseband digital signal; a packet detection unit for performing packet detection by performing an operation on the baseband digital signal and predetermined differential preamble signals; and a timing calculation unit for generating timing information of a terminal device based on the baseband digital signal and time information generated through the packet detection.

Here, the down-converter unit may oversample the RF digital signal at a frequency that is N times a clock frequency (where N is a natural number that is equal to or greater than 2).

Here, the timing calculation unit may convert the time information into a smallest unit of time that is capable of being processed in a Media Access Control (MAC) layer.

Here, the packet detection unit may include a demultiplexer unit for demultiplexing the baseband digital signal; a comparison unit for performing packet detection by performing an operation on signals demultiplexed from the baseband digital signal and the differential preamble signals; and a selection unit for selecting time information generated by accumulating a number of times the packet detection is performed.

Here, the demultiplexer unit may demultiplex the baseband digital signal into N signals depending on a number by which the clock frequency is multiplied.

Here, the comparison unit may include N differential comparison units so as to correspond to the number by which the clock frequency is multiplied.

Here, the differential comparison unit may demultiplex the signal, demultiplexed from the baseband digital signal, into a real part and an imaginary part.

Here, the differential comparison unit may generate a differential-demodulated signal of the real part and a differential-demodulated signal of the imaginary part by performing differential demodulation respectively on the real part and the imaginary part.

Here, the differential demodulation may be configured to generate the differential-demodulated signal by mapping a first input digital signal value to '1' when the first input digital signal value is greater than '0' but mapping the first input digital signal value to '0' when the first input digital signal value is equal to or less than '0'.

Here, the differential demodulation may be configured to generate the differential-demodulated signal in such a way that, for second and subsequent digital signal values, each of the digital signal values is mapped to '0' when the digital signal value is equal to a previous digital signal value that was input immediately beforehand, but is mapped to '1' when the digital signal value is not equal to the previous digital signal value.

Here, the differential comparison unit may generate a packet value by calculating a sum of a result of an AND operation performed on the differential-demodulated signal of the real part and the differential preamble signal and a result of the AND operation performed on the differential-demodulated signal of the imaginary part and the differential preamble signal.

Here, the differential comparison unit may perform the packet detection only when the packet value is greater than a preset threshold value.

Here, the differential preamble signal may be generated by performing the differential demodulation on a preamble signal acquired using a downstream signal based on Data Over Cable Service Interface Specifications (DOCSIS).

Here, the differential comparison unit may generate multiple packet values for multiple differential preamble signals, which are generated in advance for respective types of preamble, by calculating a sum of a result of an AND operation performed on the differential-demodulated signal of the real part and each of the multiple differential preamble signals and a result of the AND operation performed on the differential-demodulated signal of the imaginary part and each of the multiple differential preamble signals.

Here, the differential comparison unit may perform the packet detection only for packet values that are greater than the preset threshold value, among the multiple packet values.

Here, the differential comparison unit may generate time information based on times at which the packet values that are greater than the preset threshold value are detected and store a number that accumulates whenever each of the packet values is detected.

Here, the selection unit may compare the accumulated numbers and select a packet value having the largest accumulated number.

Here, the selection unit may select a baseband digital signal that is input to a differential comparison unit that generates the packet value having the largest accumulated number and time information corresponding to the packet value having the largest accumulated number, and may deliver the selected baseband digital signal and the selected time information to the timing calculation unit.

Also, in order to accomplish the above objects, a method for detecting an upstream RF signal based on a preamble, in which an apparatus for detecting an upstream RF signal based on a preamble is used, according to an embodiment of the present invention includes receiving an RF analog signal and converting the RF analog signal into an RF digital signal; converting the RF digital signal into a baseband digital signal; performing packet detection by performing an operation on the baseband digital signal and predetermined differential preamble signals; and generating timing information of a terminal device based on time information generated through the packet detection.

Here, performing the packet detection may include demultiplexing the baseband digital signal; performing the packet detection by performing an operation on signals demultiplexed from the baseband digital signal and the differential preamble signals; and selecting time information generated by accumulating a number of times the packet detection is performed.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
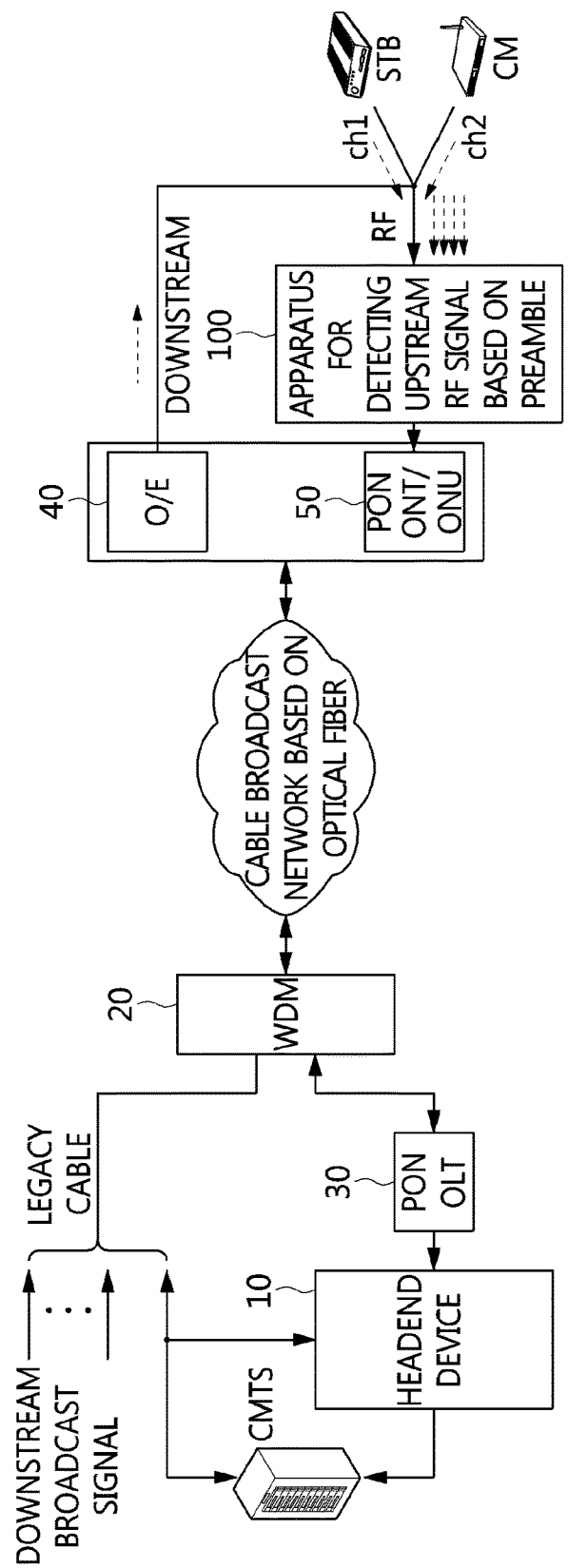
FIG. 1 is a view that shows a cable broadcast network system based on optical fiber according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising", and "includes" and/or "including", specify the presence of stated elements but do not preclude the presence or addition of one or more other elements unless otherwise specified.

Hereinafter, a preferred embodiment of the present invention will be described in detail with reference to the accompanying drawings.

FIG. 1 is a view that shows a cable broadcast network system based on optical fiber according to an embodiment of the present invention.

Referring to FIG. 1, a cable broadcast network system based on optical fiber according to an embodiment of the present invention includes a headend device and an apparatus for detecting an upstream RF signal based on a preamble therein, and may thereby provide an interactive smart media service without replacing existing devices used in the cable broadcast network system, such as a Cable Modem (CM), a Cable Modem Termination System (CMTS), and the like.

A terminal device may detect an RF signal transmitted from a CM, convert the RF signal into a digital signal, and transmit the digital signal. Accordingly, the digital signal in the form of an IP packet may be transmitted to the headend device over the optical fiber-based cable broadcast network. The transmitted digital signal is converted back into an analog RF signal, and may then be transmitted to the CMTS. Here, in order to transmit the upstream RF signal, the apparatus for detecting an upstream RF signal based on a preamble according to an embodiment of the present invention may use information about the time at which the RF signal is detected, which is acquired during the process of transmitting the upstream RF signal. That is, the apparatus for detecting an upstream RF signal based on a preamble according to an embodiment of the present invention is configured to detect an upstream RF signal based on Data Over Cable Service Interface Specifications (DOCSIS), which is generated in existing cable systems, to convert the upstream RF signal into a baseband digital signal, and to output the baseband digital signal.

Here, the cable broadcast network system may correspond to an apparatus for cable broadcasting including an apparatus for detecting an RF signal and the headend device.

Figure 2:
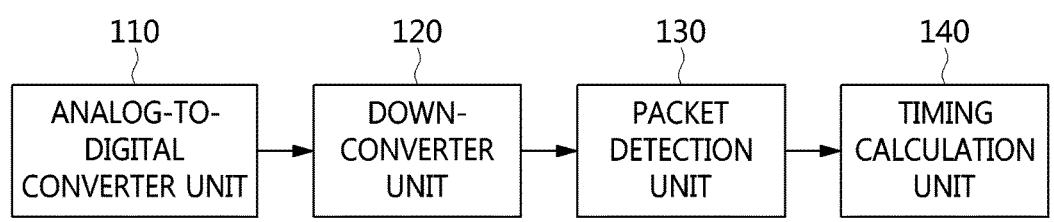
FIG. 2 is a block diagram that shows an apparatus for detecting an upstream RF signal based on a preamble according to an embodiment of the present invention.

FIG. 2 is a block diagram that shows an apparatus for detecting an upstream RF signal based on a preamble according to an embodiment of the present invention.

Referring to FIG. 2, the apparatus for detecting an upstream RF signal based on a preamble according to an embodiment of the present invention includes an analog-to-digital converter unit 110, a down-converter unit 120, a packet detection unit 130, and a timing calculation unit 140.

The analog-to-digital converter unit 110 may receive an RF analog signal and convert the same into an RF digital signal.

The down-converter unit 120 may convert the RF digital signal into a baseband digital signal.

Here, the down-converter unit 120 may oversample the RF digital signal at a frequency that is N times the clock frequency (where N is a natural number that is equal to or greater than 2).

The packet detection unit 130 may perform packet detection by performing an operation on the baseband digital signal using predetermined differential preamble signals.

Here, the packet detection unit 130 may include a demultiplexer unit 131, a comparison unit 132, and a selection unit 133.

The demultiplexer unit 131 may demultiplex the baseband digital signal.

Here, the demultiplexer unit 131 may demultiplex the baseband digital signal into N signals depending on the number by which the clock frequency is multiplied.

The comparison unit 132 may perform packet detection by performing an operation on the differential preamble signals and the signals that are demultiplexed from the baseband digital signal.

Here, the comparison unit 132 may include N differential comparison units 132a, 132b to 132n.

Here, the comparison unit 132 may perform packet detection in parallel using the multiple differential comparison units.

Each of the differential comparison units 132a, 132b to 132n may include a real-part-imaginary-part demultiplexer unit 1320, a differential demodulation unit 1321, a differential preamble signal storage unit 1322, a threshold comparison unit 1323, and an information generation unit 1324.

The real-part-imaginary-part demultiplexer unit 1320 may demultiplex a baseband digital signal into a real part and an imaginary part.

Here, the real-part-imaginary-part demultiplexer unit 1320 may perform demultiplexing using only the signs of the real part and the imaginary part. Accordingly, the present invention may perform packet detection regardless of the amplitude of an input signal, and may reduce the computational load on hardware and complexity by performing a bit operation.

The differential demodulation unit 1321 performs differential demodulation respectively on the real part and the imaginary part, which are demultiplexed from the baseband digital signal, based on the signs of the real part and the imaginary part, and may thereby generate differential-demodulated signals of the real part and of the imaginary part.

The differential-demodulated signal may be generated by performing differential demodulation in such a way that a first input digital signal value is mapped to '1' when it is greater than '0' but is mapped to '0' when it is equal to or less than '0'.

Then, for second and subsequent digital signal values, the digital signal value is mapped to '0' if it is equal to a previous digital signal value that was input immediately beforehand, but is mapped to '1' if the digital signal value is not equal to the previous digital signal value, whereby the differential-demodulated signal may be generated.

For example, when the code of an input signal is [1 0 0 1 1 0], because the first value of the input signal is '1', the first value of the differential-demodulated signal may be mapped to '1'. Also, because the second value of the input signal, which is '0', is not equal to the first value '1', the second value of the differential-demodulated signal may be mapped to '1'. Also, because the third value of the input signal, which is '0', is equal to the second value '0', the third value of the differential-demodulated signal may be mapped to '0'. Also, because the fourth value of the input signal, which is '1', is not equal to the third value '0', the fourth value of the differential-demodulated signal may be mapped to '1'. Also, because the fifth value of the input signal, which is '1', is equal to the fourth value '1', the fifth value of the differential-demodulated signal may be mapped to '0'. Also, because the sixth value of the input signal, which is '0', is not equal to the fifth value '1', the sixth value of the differential-demodulated signal may be mapped to '1'.

That is, the finally generated differential-demodulated signal may become [1 1 0 1 0 1].

The differential preamble signal storage unit 1322 may store one or more differential preamble signals.

Here, the differential preamble signal storage unit 1322 may store multiple differential preamble signals generated for respective types of preamble.

Here, a differential preamble signal may be generated by performing differential demodulation on a preamble signal acquired using a DOCSIS-based downstream signal.

Here, the type of the differential preamble signal may be determined in advance, and the differential preamble signals may be stored in advance in the differential preamble signal storage unit 1322.

Each of the differential comparison units 132a, 132b to 132n may generate a packet value by calculating the sum of the result of an AND operation performed on the differential-demodulated signal of the real part and the differential preamble signal and the result of the AND operation performed on the differential-demodulated signal of the imaginary part and the differential preamble signal.

The threshold comparison unit 1323 may perform packet detection only when the packet value is greater than a preset threshold value.

Also, each of the differential comparison units 132a, 132b to 132n may generate multiple packet values for the multiple differential preamble signals, which are generated in advance for the respective types of preamble, by calculating the sum of the result of an AND operation performed on the differential-demodulated signal of the real part and each of the differential preamble signals and the result of the AND operation performed on the differential-demodulated signal of the imaginary part and each of the differential preamble signals.

Here, the threshold comparison unit 1323 may perform packet detection only for packet values that are greater than the preset threshold value, among the multiple packet values.

Here, the AND operation may be performed in parallel for the real part and the imaginary part, and the summed packet value may be up to twice the length of the preamble.

Here, the information generation unit 1324 may generate time information based on the times at which packet values that are greater than the preset threshold value are detected, and may store a number that accumulates whenever each of the packet values is detected.

The selection unit 133 may select time information generated by accumulating the number of times packet detection is performed.

Here, the selection unit 133 compares the accumulated numbers, and may select the packet value having the largest accumulated number.

Here, the selection unit 133 may select the baseband digital signal that was input to the differential comparison unit (i.e. one of 132a, 132b to 132n) that generates the packet value having the largest accumulated number and time information corresponding to the packet value, and may deliver the same to the timing calculation unit 140.

That is, the selection unit 133 may select the differential comparison unit that outputs the packet value having the largest accumulated number from among the multiple differential comparison units 132a, 132b to 132n.

The timing calculation unit 140 may output the baseband digital signal and the time information generated through packet detection.

Here, the timing calculation unit 140 may convert the time information to the smallest unit of time that can be processed in a Media Access Control (MAC) layer.

Here, the timing calculation unit 140 may deliver the signal corresponding to the converted time information to a block related to timing and synchronization.

Also, the timing calculation unit 140 may deliver the baseband digital signal to a block for transmitting the baseband digital signal in the form of an IP packet.

Figure 3:
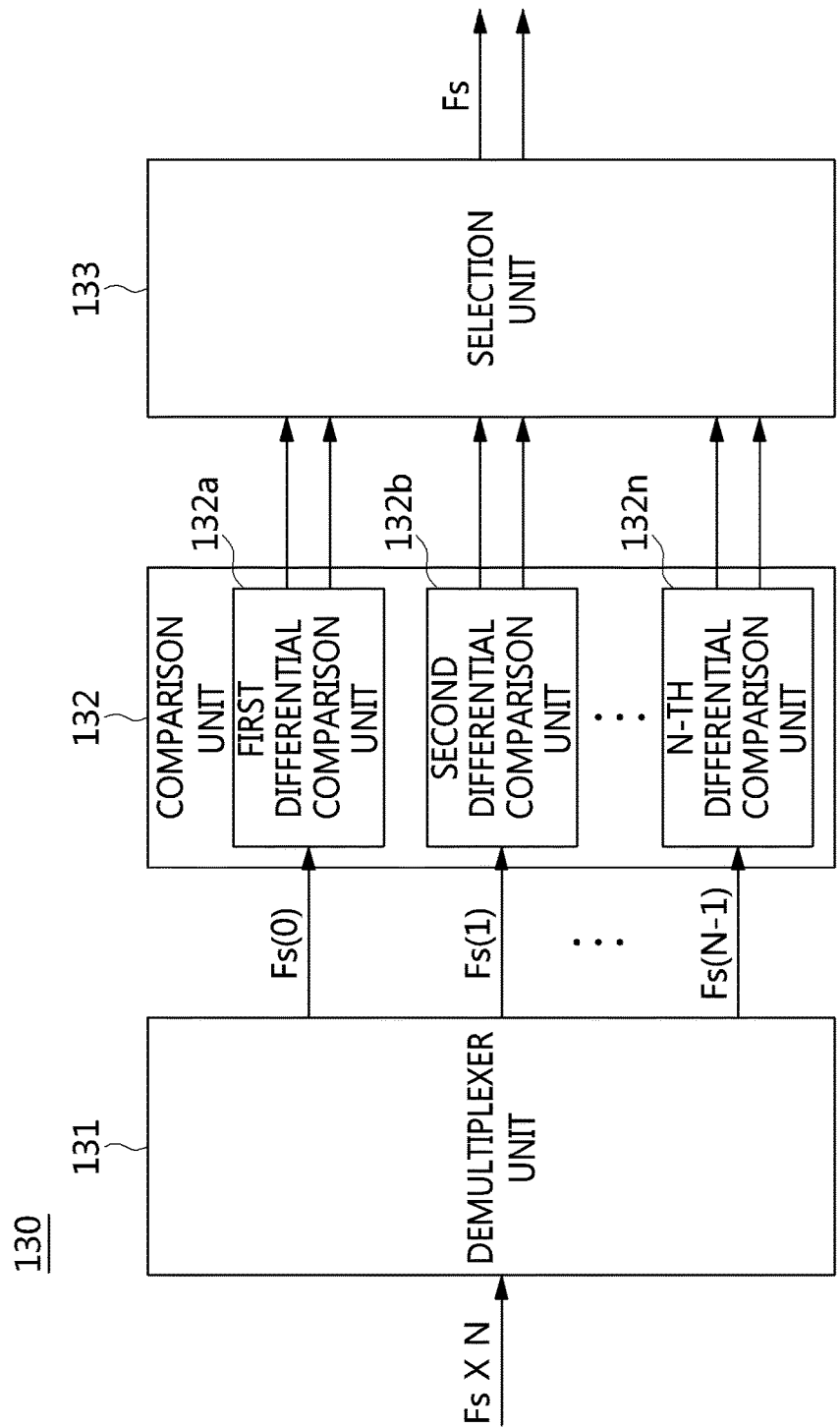
FIG. 3 is a block diagram that specifically shows an example of the packet detection unit illustrated in FIG. 2.

FIG. 3 is a block diagram that specifically shows an example of the packet detection unit illustrated in FIG. 2.

Referring to FIG. 3, the packet detection unit 130 according to an embodiment of the present invention may include a demultiplexer unit 131, a comparison unit 132, and a selection unit 133.

The demultiplexer unit 131 may demultiplex a baseband digital signal.

Here, the demultiplexer unit 131 may demultiplex the baseband digital signal into N signals.

The comparison unit 132 may perform packet detection by performing an operation on differential preamble signals and signals that are demultiplexed from the baseband digital signal.

Here, the comparison unit 132 may include N differential comparison units 132a, 132b to 132n.

Here, the comparison unit 132 may perform packet detection in parallel using the multiple differential comparison units.

Each of the differential comparison units 132a, 132b to 132n may include a real-part-imaginary-part demultiplexer unit 1320, a differential demodulation unit 1321, a differential preamble signal storage unit 1322, a threshold comparison unit 1323, and an information generation unit 1324.

The real-part-imaginary-part demultiplexer unit 1320 may demultiplex a baseband digital signal into a real part and an imaginary part.

Here, the real-part-imaginary-part demultiplexer unit 1320 may perform demultiplexing using only the signs of the real part and the imaginary part. Accordingly, the present invention may perform packet detection regardless of the amplitude of an input signal, and may reduce the computational load on hardware and complexity by performing a bit operation.

The differential demodulation unit 1321 performs differential demodulation on the real part and the imaginary part, which are demultiplexed from the baseband digital signal, based on the signs of the real part and the imaginary part, and may thereby generate differential-demodulated signals of the real part and of the imaginary part.

The differential-demodulated signal may be generated by performing differential demodulation in such a way that a first input digital signal value is mapped to '1' when it is greater than '0' but is mapped to '0' when it is equal to or less than '0'.

Then, for second and subsequent digital signal values, the digital signal value is mapped to '0' if it is equal to a previous digital signal value that was input immediately beforehand, but is mapped to '1' if it is not equal to the previous digital signal value, whereby the differential-demodulated signal may be generated.

For example, when the code of an input signal is [1 0 0 1 1 0], because the first value of the input signal is '1', the first value of the differential-demodulated signal may be mapped to '1'. Also, because the second value of the input signal, which is '0', is not equal to the first value '1', the second value of the differential-demodulated signal may be mapped to '1'. Also, because the third value of the input signal, which is '0', is equal to the second value '0', the third value of the differential-demodulated signal may be mapped to '0'. Also, because the fourth value of the input signal, which is '1', is not equal to the third value '0', the fourth value of the differential-demodulated signal may be mapped to '1'. Also, because the fifth value of the input signal, which is '1', is equal to the fourth value '1', the fifth value of the differential-demodulated signal may be mapped to '0'. Also, because the sixth value of the input signal, which is '0', is not equal to the fifth value '1', the sixth value of the differential-demodulated signal may be mapped to '1'.

That is, the finally generated differential-demodulated signal may become [1 1 0 1 0 1].

The differential preamble signal storage unit 1322 may store one or more differential preamble signals.

Here, the differential preamble signal storage unit 1322 may store multiple differential preamble signals generated for respective types of preamble.

Here, a differential preamble signal may be generated by performing differential demodulation on a preamble signal acquired using a DOCSIS-based downstream signal.

Here, the type of the differential preamble signal may be determined in advance, and the differential preamble signals may be stored in advance in the differential preamble signal storage unit 1322.

Each of the differential comparison units 132a, 132b to 132n may generate a packet value by calculating the sum of the result of an AND operation performed on the differential-demodulated signal of the real part and the differential preamble signal and the result of the AND operation performed on the differential-demodulated signal of the imaginary part and the differential preamble signal.

The threshold comparison unit 1323 may perform packet detection only when the packet value is greater than a preset threshold value.

Also, each of the differential comparison units 132a, 132b to 132n may generate multiple packet values for the multiple differential preamble signals, which are generated in advance for the respective types of preamble, by calculating the sum of the result of an AND operation performed on the differential-demodulated signal of the real part and each of the differential preamble signals and the result of the AND operation performed on the differential-demodulated signal of the imaginary part and each of the differential preamble signals.

Here, the threshold comparison unit 1323 may perform packet detection only for packet values that are greater than the preset threshold value, among the multiple packet values.

Here, the AND operation may be performed in parallel for the real part and the imaginary part, and the summed packet value may be up to twice the length of the preamble.

Here, the information generation unit 1324 generates time information based on the times at which packet values that are greater than the preset threshold value are detected, and may store a number that accumulates whenever each of the packet values is detected.

The selection unit 133 may select time information generated by accumulating the number of times packet detection is performed.

Here, the selection unit 133 may compare the accumulated numbers, and may select the packet value having the largest accumulated number.

Here, the selection unit 133 may select the baseband digital signal that was input to the differential comparison unit (i.e. one of 132a, 132b to 132n) that generates the packet value having the largest accumulated number and time information corresponding to the packet value, and may deliver the same to the timing calculation unit 140.

That is, the selection unit 133 may select the differential comparison unit that outputs the packet value having the largest accumulated number from among the multiple differential comparison units 132a, 132b to 132n.

Figure 4:
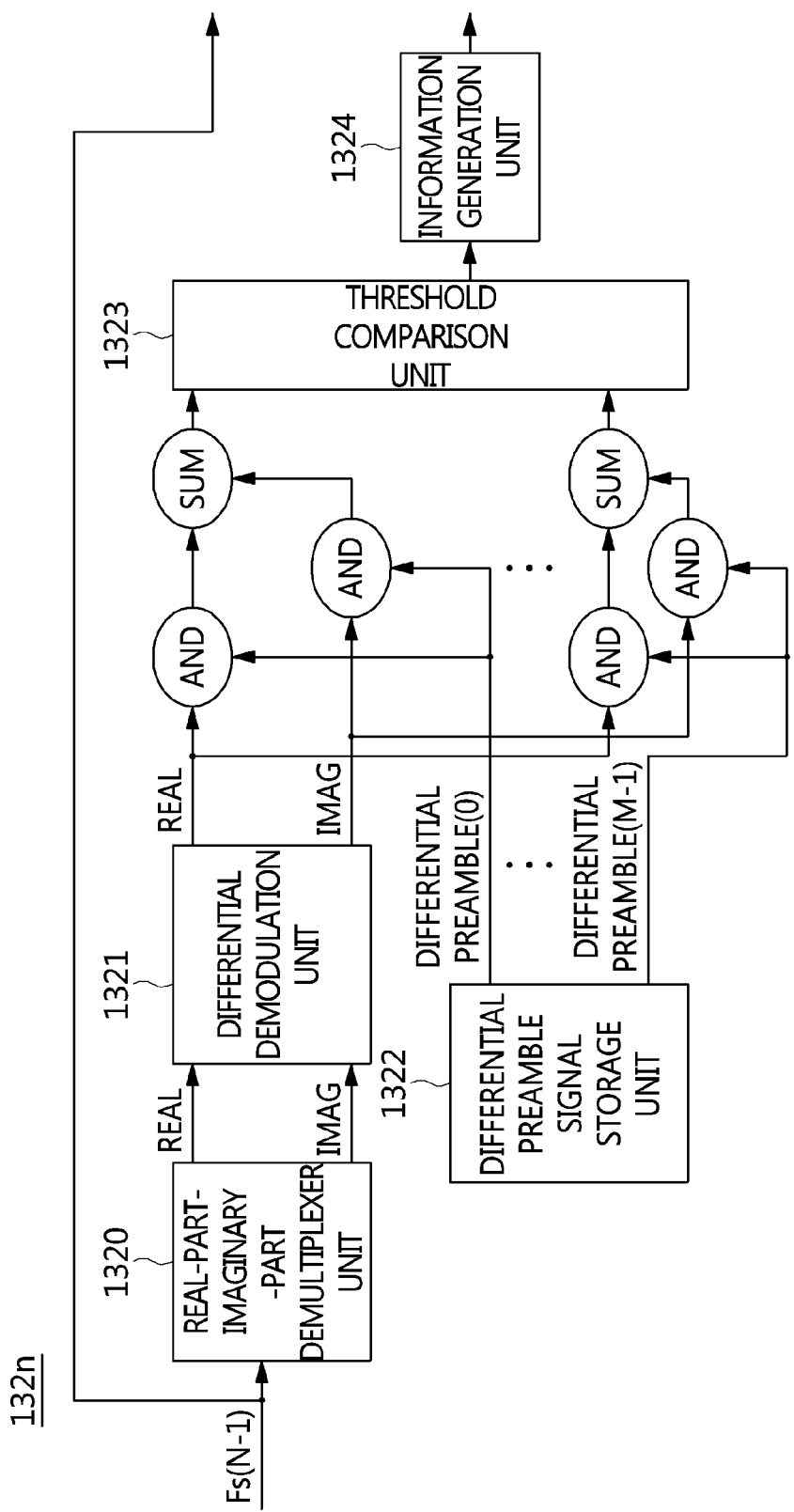
FIG. 4 is a block diagram that specifically shows an example of the differential comparison unit illustrated in FIG. 3.

FIG. 4 is a block diagram that specifically shows an example of the differential comparison unit illustrated in FIG. 3.

Referring to FIG. 4, the differential comparison unit 132n according to an embodiment of the present invention may include a real-part-imaginary-part demultiplexer unit 1320, a differential demodulation unit 1321, a differential preamble signal storage unit 1322, a threshold comparison unit 1323, and an information generation unit 1324.

The real-part-imaginary-part demultiplexer unit 1320 may demultiplex a baseband digital signal into a real part and an imaginary part.

Here, the real-part-imaginary-part demultiplexer unit 1320 may perform demultiplexing using only the signs of the real part and the imaginary part. Accordingly, the present invention may perform packet detection regardless of the amplitude of an input signal, and may reduce the computational load on hardware and complexity by performing a bit operation.

The differential demodulation unit 1321 performs differential demodulation respectively on the real part and the imaginary part, which are demultiplexed from the baseband digital signal, based on the signs of the real part and the imaginary part, and may thereby generate differential-demodulated signals of the real part and of the imaginary part.

The differential-demodulated signal may be generated by performing differential demodulation in such a way that a first input digital signal value is mapped to '1' when it is greater than '0' but is mapped to '0' when it is equal to or less than '0'.

Then, for second and subsequent digital signal values, the digital signal value is mapped to '0' if it is equal to a previous digital signal value that was input immediately beforehand, but is mapped to '1' if it is not equal to the previous digital signal value, whereby the differential-demodulated signal may be generated.

For example, when the code of an input signal is [1 0 0 1 1 0], because the first value of the input signal is '1', the first value of the differential-demodulated signal may be mapped to '1'. Also, because the second value of the input signal, which is '0', is not equal to the first value '1', the second value of the differential-demodulated signal may be mapped to '1'. Also, because the third value of the input signal, which is '0', is equal to the second value '0', the third value of the differential-demodulated signal may be mapped to '0'. Also, because the fourth value of the input signal, which is '1', is not equal to the third value '0', the fourth value of the differential-demodulated signal may be mapped to '1'. Also, because the fifth value of the input signal, which is '1', is equal to the fourth value '1', the fifth value of the differential-demodulated signal may be mapped to '0'. Also, because the sixth value of the input signal, which is '0', is not equal to the fifth value '1', the sixth value of the differential-demodulated signal may be mapped to '1'.

That is, the finally generated differential-demodulated signal may become [1 1 0 1 0 1].

The differential preamble signal storage unit 1322 may store one or more differential preamble signals.

Here, the differential preamble signal storage unit 1322 may store multiple differential preamble signals generated for respective types of preamble.

Here, a differential preamble signal may be generated by performing differential demodulation on a preamble signal acquired using a DOCSIS-based downstream signal.

Here, the type of the differential preamble signal may be determined in advance, and the differential preamble signals may be stored in advance in the differential preamble signal storage unit 1322.

The differential comparison unit 132n may generate a packet value by calculating the sum of the result of an AND operation performed on the differential-demodulated signal of the real part and the differential preamble signal and the result of the AND operation performed on the differential-demodulated signal of the imaginary part and the differential preamble signal.

The threshold comparison unit 1323 may perform packet detection only when the packet value is greater than a preset threshold value.

Also, the differential comparison unit 132n may generate multiple packet values for multiple differential preamble signals, which are generated in advance for respective types of preamble, by calculating the sum of the result of an AND operation performed on the differential-demodulated signal of the real part and each of the differential preamble signals and the result of the AND operation performed on the differential-demodulated signal of the imaginary part and each of the differential preamble signals.

Here, the threshold comparison unit 1323 may perform packet detection only for packet values that are greater than the preset threshold value, among the multiple packet values.

Here, the AND operation may be performed in parallel for the real part and the imaginary part, and the summed packet value may be up to twice the length of the preamble.

Here, the information generation unit 1324 generates time information based on the times at which packet values that are greater than the preset threshold value are detected, and may store a number that accumulates whenever each of the packet values is detected.

Figure 5:
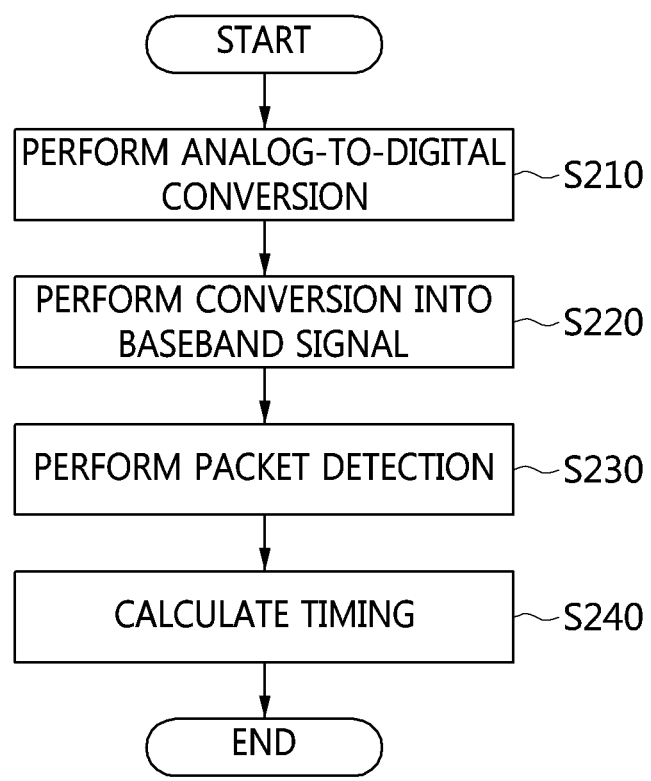
FIG. 5 is a flowchart that shows a method for detecting an upstream RF signal based on a preamble according to an embodiment of the present invention.

FIG. 5 is a flowchart that shows a method for detecting an upstream RF signal based on a preamble according to an embodiment of the present invention.

Referring to FIG. 5, in the method for detecting an upstream RF signal based on a preamble according to an embodiment of the present invention, first, analog-to-digital conversion may be performed at step S210.

That is, at step S210, the analog-to-digital converter unit 110 may receive an RF analog signal and convert the same into an RF digital signal.

Also, in the method for detecting an upstream RF signal based on a preamble according to an embodiment of the present invention, conversion into a baseband digital signal may be performed at step S220.

That is, at step S220, the RF digital signal may be converted into a baseband digital signal.

Here, at step S220, the RF digital signal may be oversampled at a frequency that is N times the clock frequency (where N is a natural number that is equal to or greater than 2).

Also, in the method for detecting an upstream RF signal based on a preamble according to an embodiment of the present invention, packet detection may be performed at step S230.

That is, at step S230, packet detection may be performed by performing an operation on the baseband digital signal and predetermined differential preamble signals.

Here, at step S230, first, the baseband digital signal may be demultiplexed at step S231.

That is, at step S231, the baseband digital signal may be demultiplexed into N signals depending on the number by which the clock frequency is multiplied.

Also, at step S230, packet detection may be performed at step S232.

That is, at step S232, packet detection may be performed by performing an operation on the differential preamble signals and the signals that are demultiplexed from the baseband digital signal.

Here, at step S232, first, demultiplexing into a real part and an imaginary part may be performed at step S232*a*.

That is, at step S232*a*, the signal, demultiplexed from the baseband digital signal, may be demultiplexed into a real part and an imaginary part.

Here, at step S232*a*, demultiplexing may be performed using only the signs of the real part and the imaginary part. Accordingly, the present invention may perform packet detection regardless of the amplitude of an input signal, and may reduce the computational load on hardware and complexity by performing a bit operation.

Also, at step S232, differential demodulation may be performed at step S232*b*.

That is, at step S232*b*, differential demodulation is performed respectively on the real part and the imaginary part, which are demultiplexed from the baseband digital signal, based on the signs of the real part and the imaginary part, whereby differential-demodulated signals of the real part and of the imaginary part may be generated.

The differential-demodulated signal may be generated by performing differential demodulation in such a way that a first input digital signal value is mapped to '1' when it is greater than '0' but is mapped to '0' when it is equal to or less than '0'.

Then, for second and subsequent digital signal values, the digital signal value is mapped to '0' if it is equal to a previous digital signal value that was input immediately beforehand, but is mapped to '1' if it is not equal to the previous digital signal value, whereby the differential-demodulated signal may be generated.

For example, when the code of an input signal is [1 0 0 1 1 0], because the first value of the input signal is '1', the first value of the differential-demodulated signal may be mapped to '1'. Also, because the second value of the input signal, which is '0', is not equal to the first value '1', the second value of the differential-demodulated signal may be mapped to '1'. Also, because the third value of the input signal, which is '0', is equal to the second value '0', the third value of the differential-demodulated signal may be mapped to '0'. Also, because the fourth value of the input signal, which is '1', is not equal to the third value '0', the fourth value of the differential-demodulated signal may be mapped to '1'. Also, because the fifth value of the input signal, which is '1', is equal to the fourth value '1', the fifth value of the differential-demodulated signal may be mapped to '0'. Also, because the sixth value of the input signal, which is '0', is not equal to the fifth value '1', the sixth value of the differential-demodulated signal may be mapped to '1'.

That is, the finally generated differential-demodulated signal may become [1 1 0 1 0 1].

Here, a differential preamble signal may be generated by performing differential demodulation on a preamble signal acquired using a DOCSIS-based downstream signal.

Here, the type of the differential preamble signal may be determined in advance, and the differential preamble signals may be stored in advance in the differential preamble signal storage unit 1322.

Also, at step S232, AND/SUM operations may be performed at step S232*c*.

That is, at step S232*c*, a packet value may be generated by calculating the sum of the result of an AND operation performed on the differential-demodulated signal of the real part and the differential preamble signal and the result of the AND operation performed on the differential-demodulated signal of the imaginary part and the differential preamble signal.

Also, at step S232, the packet value may be compared with a threshold value at step S232*d*.

In detail, at step S323*d*, when the packet value is greater than the preset threshold value, the threshold comparison unit 1323 may perform packet detection at step S232*e*. However, when the packet value is equal to or less than the preset threshold value, the threshold comparison unit 1323 may compare the preset threshold value with another packet value acquired by performing the AND/SUM operations on another type of differential preamble signal.

Also, at step S232*c*, multiple packet values may be generated for the multiple differential preamble signals, which are generated in advance for the respective types of preamble, by calculating the sum of the result of an AND operation performed on the differential-demodulated signal of the real part and each of the differential preamble signals and the result of the AND operation performed on the differential-demodulated signal of the imaginary part and each of the differential preamble signals.

Here, at step S232d, for the multiple packet values, when a packet value is greater than the preset threshold value, packet detection may be performed at step S232e. However, when the packet value is equal to or less than the preset threshold value, another packet value, acquired by performing AND/SUM operations on another type of differential preamble signal, may be compared with the preset threshold value.

Here, the AND operation may be performed in parallel for the real part and the imaginary part, and the summed packet value may be up to twice the length of the preamble.

Also, at step S232, packet detection may be performed at step S232e.

That is, at step S232e, time information may be generated based on the times at which the packet values that are greater than the preset threshold value are detected, and a number that accumulates whenever each of the packet values is detected may be stored.

Also, at step S230, time information may be selected at step S233.

That is, at step S233, time information, generated by accumulating the number of times packet detection is performed, may be selected.

Here, at step S233, the accumulated numbers may be compared, and a packet value having the largest accumulated number may be selected.

Here, at step S233, the baseband digital signal that was input to the differential comparison unit (i.e. one of 132a, 132b to 132n) that generates the packet value having the largest accumulated number and time information corresponding to the packet value may be selected and delivered.

That is, at step S233, the differential comparison unit that outputs the packet value having the largest accumulated number may be selected from among the multiple differential comparison units 132a, 132b to 132n.

Also, in the method for detecting an upstream RF signal based on a preamble according to an embodiment of the present invention, timing calculation may be performed at step S240.

That is, at step S240, the baseband digital signal and time information generated through packet detection may be output.

Here, at step S240, the time information may be converted into the smallest unit of time that can be processed in a Media Access Control (MAC) layer.

Here, at step S240, the signal corresponding to the converted time information may be delivered to a block related to timing and synchronization.

Also, at step S240, the baseband digital signal may be delivered to a block for transmitting the baseband digital signal in the form of an IP packet.

Figure 6:
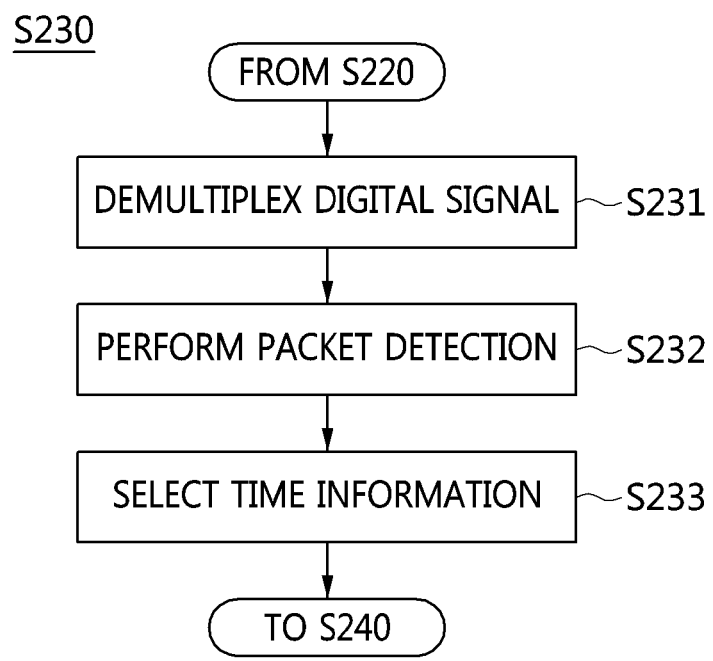
FIG. 6 is a flowchart that specifically shows an example of the step of performing packet detection illustrated in FIG. 5.

FIG. 6 is a flowchart that specifically shows an example of the step of performing packet detection, illustrated in FIG. 5.

Referring to FIG. 6, at step S230, first, a baseband digital signal may be demultiplexed at step S231.

That is, at step S231, the baseband digital signal may be demultiplexed into N signals.

Also, at step S230, packet detection may be performed at step S232.

That is, at step S232, packet detection may be performed by performing an operation on differential preamble signals and on signals that are demultiplexed from the baseband digital signal.

Here, at step S232, first, demultiplexing into a real part and an imaginary part may be performed at step S232a.

That is, at step S232a, the baseband digital signal may be demultiplexed into a real part and an imaginary part.

Here, at step S232a, demultiplexing may be performed using only the signs of the real part and the imaginary part. Accordingly, the present invention may perform packet detection regardless of the amplitude of an input signal, and may reduce the computational load on hardware and complexity by performing a bit operation.

Also, at step S232, differential demodulation may be performed at step S232b.

That is, at step S232b, differential demodulation is performed respectively on the real part and the imaginary part, which are demultiplexed from the baseband digital signal, based on the signs of the real part and the imaginary part, whereby a differential-demodulated signals of the real part and of the imaginary part may be generated.

The differential-demodulated signal may be generated by performing differential demodulation in such a way that a first input digital signal value is mapped to '1' when it is greater than '0' but is mapped to '0' when it is equal to or less than '0'.

Then, for second and subsequent digital signal values, the digital signal value is mapped to '0' if it is equal to a previous digital signal value that was input immediately beforehand, but is mapped to '1' if it is not equal to the previous digital signal value, whereby the differential-demodulated signal may be generated.

For example, when the code of an input signal is [1 0 0 1 1 0], because the first value of the input signal is '1', the first value of the differential-demodulated signal may be mapped to '1'. Also, because the second value of the input signal, which is '0', is not equal to the first value '1', the second value of the differential-demodulated signal may be mapped to '1'. Also, because the third value of the input signal, which is '0', is equal to the second value '0', the third value of the differential-demodulated signal may be mapped to '0'. Also, because the fourth value of the input signal, which is '1', is not equal to the third value '0', the fourth value of the differential-demodulated signal may be mapped to '1'. Also, because the fifth value of the input signal, which is '1', is equal to the fourth value '1', the fifth value of the differential-demodulated signal may be mapped to '0'. Also, because the sixth value of the input signal, which is '0', is not equal to the fifth value '1', the sixth value of the differential-demodulated signal may be mapped to '1'.

That is, the finally generated differential-demodulated signal may become [1 1 0 1 0 1].

Here, a differential preamble signal may be generated by performing differential demodulation on a preamble signal acquired using a DOCSIS-based downstream signal.

Here, the type of the differential preamble signal may be determined in advance, and the differential preamble signals may be stored in advance in the differential preamble signal storage unit 1322.

Also, at step S232, AND/SUM operations may be performed at step S232c.

That is, at step S232c, a packet value may be generated by calculating the sum of the result of an AND operation performed on the differential-demodulated signal of the real part and the differential preamble signal and the result of the AND operation performed on the differential-demodulated signal of the imaginary part and the differential preamble signal.

Also, at step S232, the packet value may be compared with a threshold value at step S232d.

That is, at step S323d, when the packet value is greater than the preset threshold value, the threshold comparison unit 1323 may perform packet detection at step S232e. However, when the packet value is equal to or less than the preset threshold value, the threshold comparison unit 1323 may compare the preset threshold value with another packet value acquired by performing the AND/SUM operations on another type of differential preamble signal.

Also, at step S232c, multiple packet values may be generated for the multiple differential preamble signals, which are generated in advance for the respective types of preamble, by calculating the sum of the result of an AND operation performed on the differential-demodulated signal of the real part and each of the differential preamble signals and the result of the AND operation performed on the differential-demodulated signal of the imaginary part and each of the differential preamble signals.

Here, at step S232d, for the multiple packet values, when a packet value is greater than the preset threshold value, packet detection may be performed at step S232e. However, when the packet value is equal to or less than the preset threshold value, another packet value, acquired by performing AND/SUM operation on another type of differential preamble signal, may be compared with the preset threshold value.

Here, the AND operation may be performed in parallel for the real part and the imaginary part, and the summed packet value may be up to twice the length of the preamble.

Also, at step S232, packet detection may be performed at step S232e.

That is, at step S232e, time information may be generated based on the times at which the packet values that are greater than the preset threshold value are detected, and a number that accumulates whenever each of the packet values is detected may be stored.

Also, at step S230, time information may be selected at step S233.

That is, at step S233, time information, generated by accumulating the number of times packet detection is performed, may be selected.

Here, at step S233, the accumulated numbers may be compared, and the packet value having the largest accumulated number may be selected.

Here, at step S233, the baseband digital signal that was input to the differential comparison unit (i.e. one of 132a, 132b to 132n) that generates the packet value having the largest accumulated number and time information corresponding to the packet value may be selected and delivered.

That is, at step S233, the differential comparison unit that outputs the packet value having the largest accumulated number may be selected from among the multiple differential comparison units 132a, 132b to 132n.

Figure 7:
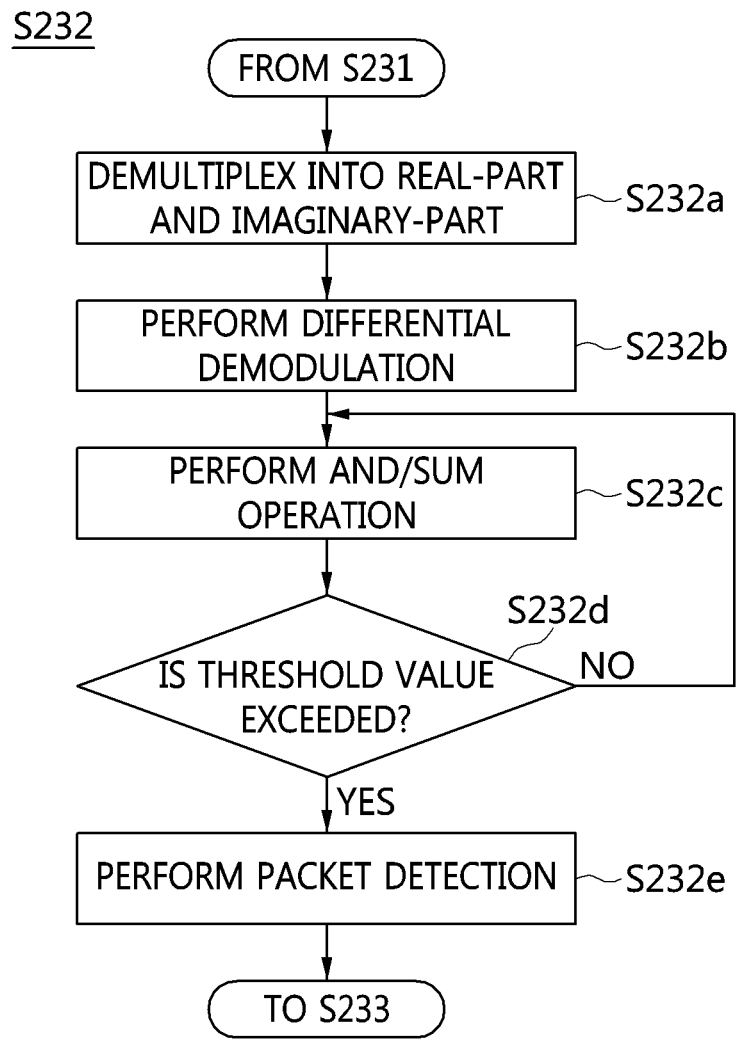
FIG. 7 is a flowchart that specifically shows an example of the step of performing packet detection illustrated in FIG. 6.

FIG. 7 is a flowchart that specifically shows an example of the step of performing packet detection, illustrated in FIG. 6.

Referring to FIG. 7, at step S232, first, demultiplexing into a real part and an imaginary part may be performed at step S232a.

That is, at step S232a, a baseband digital signal may be demultiplexed into a real part and an imaginary part.

Here, at step S232a, demultiplexing may be performed using only the signs of the real part and the imaginary part.

Accordingly, the present invention may perform packet detection regardless of the amplitude of an input signal, and may reduce the computational load on hardware and complexity by performing a bit operation.

Also, at step S232, differential demodulation may be performed at step S232b.

That is, at step S232b, differential demodulation is performed respectively on the real part and the imaginary part, which are demultiplexed from the baseband digital signal, based on the signs of the real part and the imaginary part, whereby differential-demodulated signals of the real part and of the imaginary part may be generated.

The differential-demodulated signal may be generated by performing differential demodulation in such a way that a first input digital signal value is mapped to '1' when it is greater than '0' but is mapped to '0' when it is equal to or less than '0'.

Then, for second and subsequent digital signal values, the digital signal value is mapped to '0' if it is equal to a previous digital signal value that was input immediately beforehand, but is mapped to '1' if it is not equal to the previous digital signal value, whereby the differential-demodulated signal may be generated.

For example, when the code of an input signal is [1 0 0 1 1 0], because the first value of the input signal is '1', the first value of the differential-demodulated signal may be mapped to '1'. Also, because the second value of the input signal, which is '0', is not equal to the first value '1', the second value of the differential-demodulated signal may be mapped to '1'. Also, because the third value of the input signal, which is '0', is equal to the second value '0', the third value of the differential-demodulated signal may be mapped to '0'. Also, because the fourth value of the input signal, which is '1', is not equal to the third value '0', the fourth value of the differential-demodulated signal may be mapped to '1'. Also, because the fifth value of the input signal, which is '1', is equal to the fourth value '1', the fifth value of the differential-demodulated signal may be mapped to '0'. Also, because the sixth value of the input signal, which is '0', is not equal to the fifth value '1', the sixth value of the differential-demodulated signal may be mapped to '1'.

That is, the finally generated differential-demodulated signal may become [1 1 0 1 0 1].

Here, a differential preamble signal may be generated by performing differential demodulation on a preamble signal acquired using a DOCSIS-based downstream signal.

Here, the type of the differential preamble signal may be determined in advance, and differential preamble signals may be stored in advance in the differential preamble signal storage unit 1322.

Also, at step S232, AND/SUM operations may be performed at step S232c.

That is, at step S232c, a packet value may be generated by calculating the sum of the result of an AND operation performed on the differential-demodulated signal of the real part and the differential preamble signal and the result of the AND operation performed on the differential-demodulated signal of the imaginary part and the differential preamble signal.

Also, at step S232, the packet value may be compared with a threshold value at step S232d.

That is, at step S323d, when the packet value is greater than the preset threshold value, the threshold comparison unit 1323 may perform packet detection at step S232e. However, when the packet value is equal to or less than the preset threshold value, the threshold comparison unit 1323 may compare the preset threshold value with another packet value acquired by performing the AND/SUM operations on another type of differential preamble signal.

Also, at step S232c, multiple packet values may be generated for the multiple differential preamble signals, which are generated in advance for the respective types of preamble, by calculating the sum of the result of an AND operation performed on the differential-demodulated signal of the real part and each of the differential preamble signals and the result of the AND operation performed on the differential-demodulated signal of the imaginary part and each of the differential preamble signals.

Here, at step S232d, for the multiple packet values, when a packet value is greater than the preset threshold value, packet detection may be performed at step S232e. However, when the packet value is equal to or less than the preset threshold value, another packet value, acquired by performing AND/SUM operations on another type of differential preamble signal, may be compared with the preset threshold value.

Here, the AND operation may be performed in parallel for the real part and the imaginary part, and the summed packet value may be up to twice the length of the preamble.

Also, at step S232, packet detection may be performed at step S232e.

That is, at step S232e, time information may be generated based on the times at which packet values that are greater than the preset threshold value are detected, and a number that accumulates whenever each of the packet values is detected may be stored.

Figure 8:
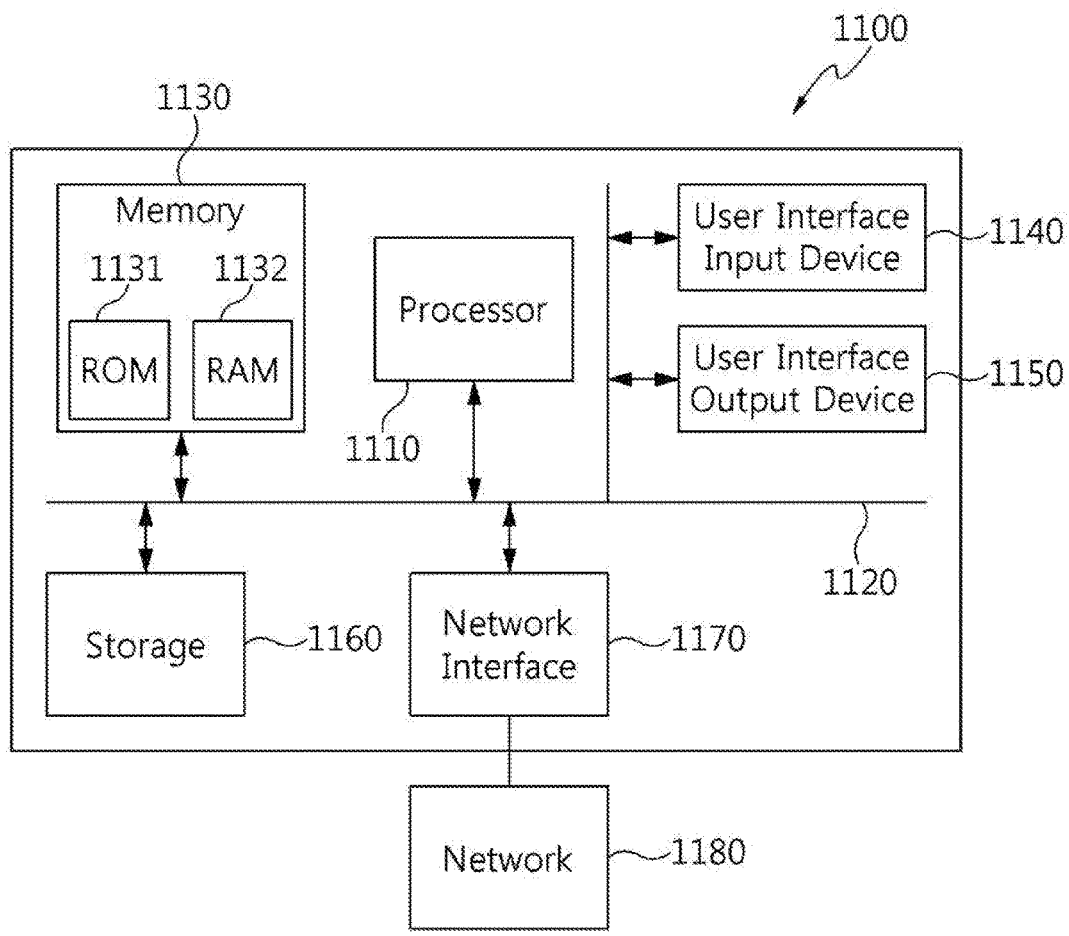
FIG. 8 is a block diagram that shows a computer system according to an embodiment of the present invention.

FIG. 8 is a block diagram that shows a computer system according to an embodiment of the present invention.

Referring to FIG. 8, an embodiment of the present invention may be implemented in a computer system 1100 including a computer-readable recording medium. As illustrated in FIG. 8, the computer system 1100 may include one or more processors 1110, memory 1130, a user interface input device 1140, a user interface output device 1150 and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be various types of volatile or nonvolatile storage media. For example, the memory may include ROM 1131 or RAM 1132.

The present invention may provide an interactive smart media service by detecting an upstream RF signal without changing a transmission method used in a digital cable broadcast system and without replacing devices used therein.

Also, the present invention may reduce the computational load on hardware and complexity by detecting a packet regardless of the amplitude of a signal.

Also, the present invention may minimize error in estimation of an RF signal detected based on a preamble.

As described above, the apparatus and method for detecting an upstream RF signal based on a preamble according to the present invention are not limitedly applied to the configurations and operations of the above-described embodiments, but all or some of the embodiments may be selectively combined and configured, so that the embodiments may be modified in various ways.

What is claimed is:

1. An apparatus for detecting an upstream RF signal based on a preamble, comprising:

an analog-to-digital converter unit for receiving an RF analog signal and converting the RF analog signal into an RF digital signal;
a down-converter unit for converting the RF digital signal into a baseband digital signal;
a packet detection unit for performing packet detection by performing an operation on the baseband digital signal and predetermined differential preamble signals; and
a timing calculation unit for outputting the baseband digital signal and time information generated through the packet detection,
wherein the packet detection unit comprises:
a demultiplexer unit for demultiplexing the baseband digital signal;
a comparison unit for performing packet detection by performing an operation on signals demultiplexed from the baseband digital signal and the differential preamble signals; and
a selection unit for selecting time information generated by accumulating a number of times the packet detection is performed,
wherein the comparison unit generates a packet value by calculating a sum of results of performing an AND operation on each of the differential preamble signals and each of the signals demultiplexed from the baseband digital signal.

2. The apparatus of claim 1, wherein the down-converter unit oversamples the RF digital signal at a frequency that is N times a clock frequency (where N is a natural number that is equal to or greater than 2).

3. The apparatus of claim 2, wherein the demultiplexer unit demultiplexes the baseband digital signal into N signals depending on a number by which the clock frequency is multiplied.

4. The apparatus of claim 3, wherein the comparison unit includes N differential comparison units so as to correspond to the number by which the clock frequency is multiplied.

5. The apparatus of claim 4, wherein each of the N differential comparison units demultiplexes a corresponding one of the signals, demultiplexed from the baseband digital signal, into a real part and an imaginary part.

6. The apparatus of claim 5, wherein each of the N differential comparison units generates a differential-demodulated signal of the real part and a differential-demodulated signal of the imaginary part by performing differential demodulation respectively on the real part and the imaginary part based on signs of the real part and the imaginary part.

7. The apparatus of claim 6, wherein the differential demodulation is configured to generate the differential-demodulated signal by mapping a first input digital signal value to '1' when the first input digital signal value is greater than '0' but mapping the first input digital signal value to '0' when the first input digital signal value is equal to or less than '0'.

8. The apparatus of claim 7, wherein the differential demodulation is configured to generate the differential-demodulated signal in such a way that, for second and subsequent digital signal values, each of the digital signal values is mapped to '0' when the digital signal value is equal to a previous digital signal value that was input immediately beforehand, but is mapped to '1' when the digital signal value is not equal to the previous digital signal value.

9. The apparatus of claim 8, wherein each of the N differential comparison units generates the packet value by calculating a sum of a result of an AND operation performed on the differential-demodulated signal of the real part and the differential preamble signal and a result of the AND operation performed on the differential-demodulated signal of the imaginary part and the differential preamble signal.

10. The apparatus of claim 9, wherein each of the N differential comparison units performs the packet detection only when the packet value is greater than a preset threshold value.

11. The apparatus of claim 10, wherein each of the N differential comparison units generates multiple packet values for multiple differential preamble signals, which are generated in advance for respective types of preamble, by calculating a sum of a result of an AND operation performed on the differential-demodulated signal of the real part and each of the multiple differential preamble signals and a result of the AND operation performed on the differential-demodulated signal of the imaginary part and each of the multiple differential preamble signals.

12. The apparatus of claim 11, wherein each of the N differential comparison units performs the packet detection only for packet values that are greater than the preset threshold value, among the multiple packet values.

13. The apparatus of claim 12, wherein the selection unit compares the accumulated numbers and selects a packet value having the largest accumulated number.

14. The apparatus of claim 13, wherein the selection unit selects a baseband digital signal that is input to a differential comparison unit that generates the packet value having the largest accumulated number and time information corresponding to the packet value and delivers the selected baseband digital signal and the selected time information to the timing calculation unit.

15. A method for detecting an upstream RF signal based on a preamble, in which an apparatus for detecting an upstream RF signal based on a preamble is used, comprising:

receiving an RF analog signal and converting the RF analog signal into an RF digital signal;

converting the RF digital signal into a baseband digital signal;

performing packet detection by performing an operation on the baseband digital signal and predetermined differential preamble signals; and generating timing information of a terminal device based on time information generated through the packet detection, wherein the performing packet detection comprises:
    demultiplexing the baseband digital signal;
    generating a packet value by performing an operation on signals demultiplexed from the baseband digital signal and the differential preamble signals; and
    performing packet detection based on the packet value;
    wherein the generating a packet value comprises generating the packet value by calculating a sum of results of performing an AND operation on each of the differential preamble signals and each of the signals demultiplexed from the baseband digital signal.

* * * * *